United States Patent [19]
Gochenour et al.

[11] Patent Number: 5,695,036
[45] Date of Patent: Dec. 9, 1997

[54] STOPLESS SELF ADJUSTING DIAPHRAGM CLUTCH

[75] Inventors: Daniel V. Gochenour; Mark Jennings, both of Auburn, Ind.

[73] Assignee: Dana Corporation, Toledo, Ohio

[21] Appl. No.: 597,633

[22] Filed: Feb. 7, 1996

[51] Int. Cl.$^6$ .................... F16D 13/75; F16D 13/58
[52] U.S. Cl. .................... 192/70.25; 192/89.24; 192/109 R
[58] Field of Search ................ 192/70.25, 111 A, 192/89.24, 109 R

[56] References Cited

U.S. PATENT DOCUMENTS

| | | | |
|---|---|---|---|
| 2,251,367 | 8/1941 | Miller | 192/70.25 X |
| 4,579,210 | 4/1986 | Meyer et al. | 192/89.24 |
| 4,941,557 | 7/1990 | Flotow et al. | |
| 5,069,322 | 12/1991 | Mizukami et al. | 192/70.25 |
| 5,377,803 | 1/1995 | Link et al. | |
| 5,513,735 | 5/1996 | Uenohara | 192/70.25 |
| 5,540,313 | 7/1996 | Weidinger | 192/70.25 |
| 5,560,463 | 10/1996 | Link et al. | 192/70.25 |

FOREIGN PATENT DOCUMENTS

| | | | |
|---|---|---|---|
| 2 599 446 | 12/1987 | France | 192/111 A |
| 2 606 477 | 5/1988 | France | 192/111 A |
| 4412107A1 | 11/1994 | Germany. | |
| 4337613A1 | 5/1995 | Germany. | |
| 2 207 965 | 2/1989 | United Kingdom | 192/70.25 |

OTHER PUBLICATIONS

English translation of German Patent No. DE 4,412,107A1.
Derwent Summary of DE 4,337,613A1.
Derwent Summary of DE 4,412,107A1.

*Primary Examiner*—Rodney H. Bonck
*Attorney, Agent, or Firm*—Dykema Gossett PLLC

[57] ABSTRACT

A clutch cover for use in a diaphragm spring type clutch assembly and adapted to be disposed between a flywheel fixed to a motor vehicle engine crankshaft and a transmission input shaft includes a body portion, an engagement portion, an arcuate spring retention member, and an arcuate travel stop. The body portion is spaced from and extends across the flywheel and has a central aperture adapted to receive the input shaft. A first side of the body portion is directed toward the flywheel and a second side of the body portion is directed opposite the flywheel. The engagement portion extends downward from the body portion toward the flywheel for engagement therewith. The engagement portion defines a gap between the body portion and the flywheel. The arcuate spring retention member is located proximate to an outer periphery of the body portion at a first diameter at least as large in diameter as the diaphragm spring. The travel stop is formed on the first side of the body portion radially inwardly of the spring retention member and radially outwardly of the aperture.

4 Claims, 4 Drawing Sheets

STOPLESS SELF ADJUSTING DIAPHRAGM CLUTCH

FIELD OF THE INVENTION

The present invention relates to motor vehicle drive clutches, and more particularly to self adjusting clutches employing diaphragm-type engagement springs.

BACKGROUND OF THE INVENTION

A clutch used for providing torsional driving engagement between a motor vehicle engine and a transmission may be made self adjusting by equipping it with an automatic adjustment mechanism. The automatic adjustment mechanism is used to maintain the engaged position of the diaphragm spring relative to the cover as the clutch driven disc friction elements wear. Automatic adjustment of the engaged position of the diaphragm spring relative to the cover is highly desirable in that it eliminates the need for tedious manual adjustment of the clutch. Maintaining a consistent engaged position of the spring in turn prevents the apply load decrease and resultant clutch slippage which occurs when there is no adjustment and thereby extends the life of the clutch. However, it is possible for the automatic adjustment mechanism to over-adjust if the release mechanism travels too far, making it subsequently difficult to obtain a complete release of the clutch. In some pull-type clutch systems it is practical to rely on engagement of the release mechanism with a stop feature on the transmission case or clutch housing to prevent over-adjustment. However, it is not always practical to provide a stop for the release mechanism to limit clutch adjustment. It is therefore highly desired to provide a stopless self-adjusting clutch having means for limiting the amount of adjustment in the absence of a positive stop for the release mechanism.

SUMMARY OF THE INVENTION

An advantage of the present invention is that it prevents over-adjustment of the clutch by the automatic adjustment mechanism within the clutch assembly even if the release mechanism travels beyond an optimal release position.

A clutch cover for use in a diaphragm spring type clutch assembly and adapted to be disposed between a flywheel fixed to a motor vehicle engine crankshaft and a transmission input shaft includes a body portion, an engagement portion, an arcuate spring retention member, and an arcuate travel stop. The body portion is spaced from and extends across the flywheel and has a central aperture adapted to receive the input shaft. A first side of the body portion is directed toward the flywheel and a second side of the body portion is directed opposite the flywheel. The engagement portion extends downward from the body portion toward the flywheel for engagement therewith. The engagement portion defines a gap between the body portion and the flywheel. The arcuate spring retention member is located proximate to an outer periphery of the body portion at a first diameter at least as large in diameter as an outside diameter of a diaphragm spring. The arcuate travel stop is formed on the first side of the body portion radially inwardly of the spring retention member.

DETAILED DESCRIPTION OF A PREFERRED EMBODIMENT

Figure 1:
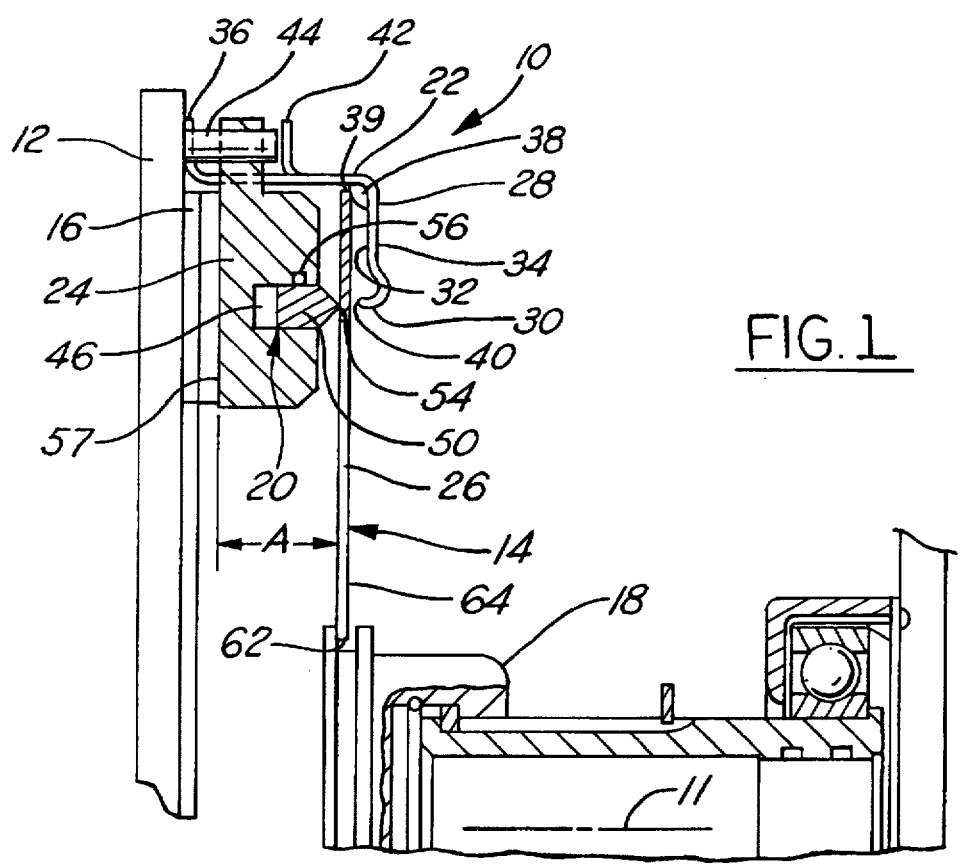
FIG. 1 is a sectional side view of a clutch assembly incorporating a first embodiment of the present invention in an engaged position.
Figure 2:
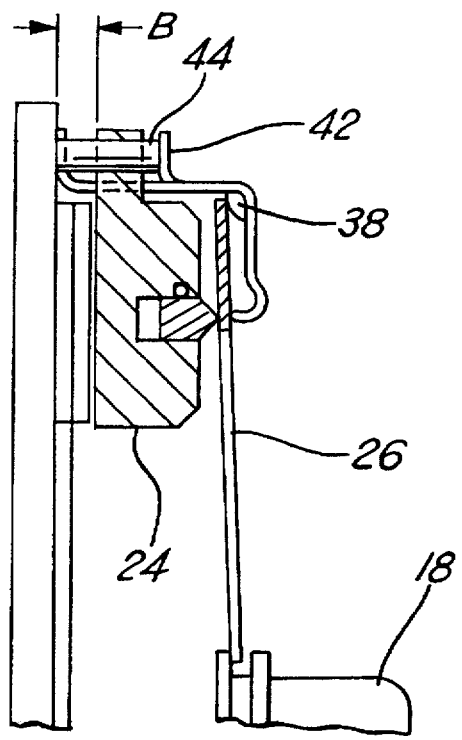
FIG. 2 is a sectional side view of the clutch assembly of FIG. 1 in a released position.
Figure 3:
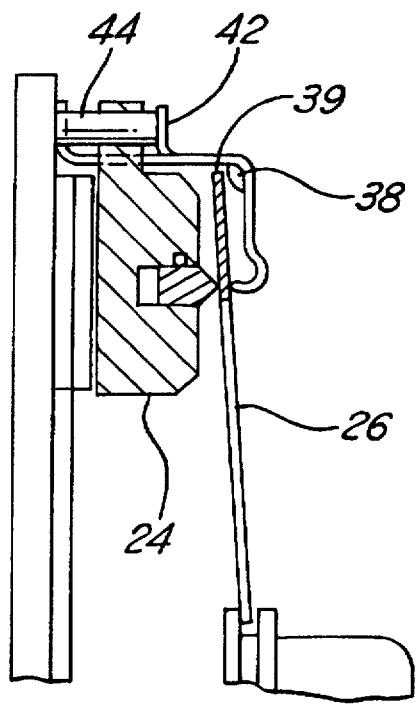
FIG. 3 is a sectional side view of the clutch assembly of FIG. 1 in an over-travel position.

A pull-type clutch assembly 10 as shown in FIGS. 1–3 includes a flywheel 12 with an axis of rotation 11, fixed to the engine crank shaft (not shown) for unitary rotation therewith. Either the flywheel 12 or the crank shaft can alternatively be considered to be a driving member. Cover assembly 14 is fixed to flywheel 12, and a driven disc assembly 16 is axially disposed between cover assembly 14 and flywheel 12. A release mechanism 18 is disposed over a transmission input shaft (not shown), or transmission bearing quill (not shown), and is pulled away from flywheel 12 to disengage clutch 10. An adjustment mechanism 20 is disposed within cover assembly 14.

Cover assembly 14 has a stamped steel cover 22 fixed to flywheel 12. Cover 22 could alternatively be formed of cast iron, or a composite material. An annularly shaped pressure plate 24 of assembly 14 is disposed between cover 22 and flywheel 12, and is rotatably fixed to cover 22 by a strap or other means permitting relative axial movement therebetween. A diaphragm spring 26 is disposed between cover 22 and pressure plate 24, biasing pressure plate toward driven disc assembly 16 and flywheel 12. Adjustment mechanism 20 is disposed between pressure plate 24 and diaphragm spring 26.

Cover 22 has a body portion 28 spaced from and extending across flywheel 12. A central aperture 30 through body portion 28 provides clearance for the transmission input shaft and release mechanism 18. A first side 32 of the body portion 28 faces flywheel 12 and a second side 34 is oppositely disposed. An engagement portion 36 extends from first side 32 to engage flywheel 12, spacing body portion 28 from flywheel 12. An arcuate spring retention feature 38 serves as a spring pivot, being engaged by diaphragm spring 26 at an outside diameter 39.

An arcuate travel stop, or travel limit 40, extends axially from body portion 28 of cover 22 toward diaphragm spring 26 opposite adjustment mechanism 20. Cover 22 also has a plurality of cover engagement tabs 42 extending therefrom in alignment with separator pins 44 pressed into pressure plate 24.

Figure 8:
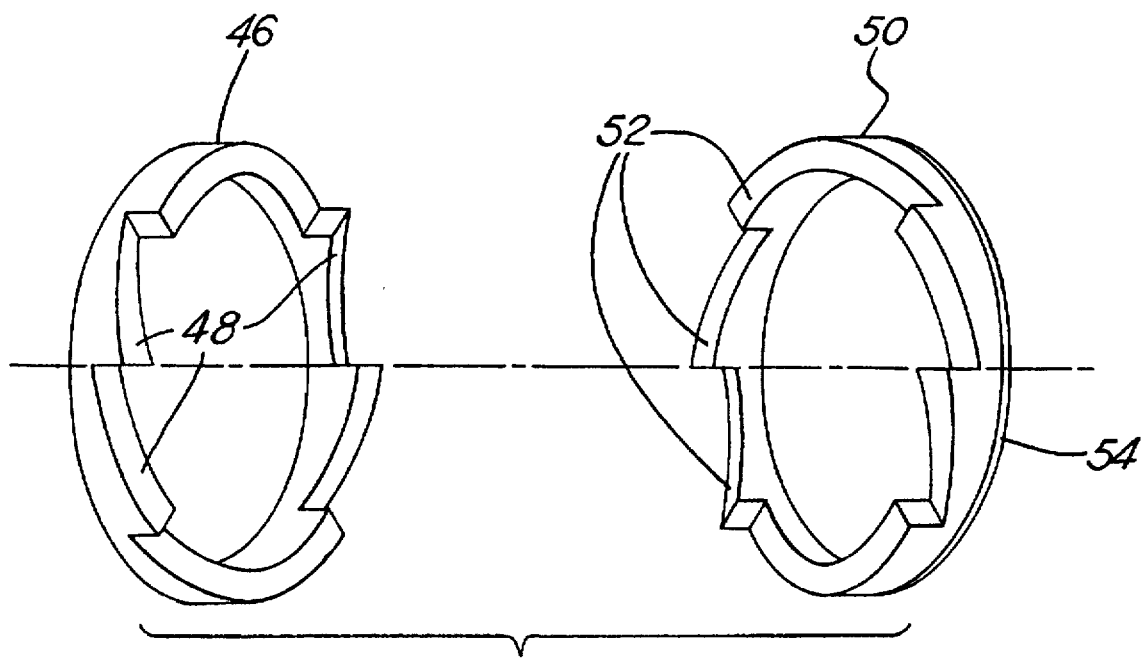
FIG. 8 is a perspective view of first and second parts of one embodiment of the adjustment mechanism of the present invention.
Figure 9:
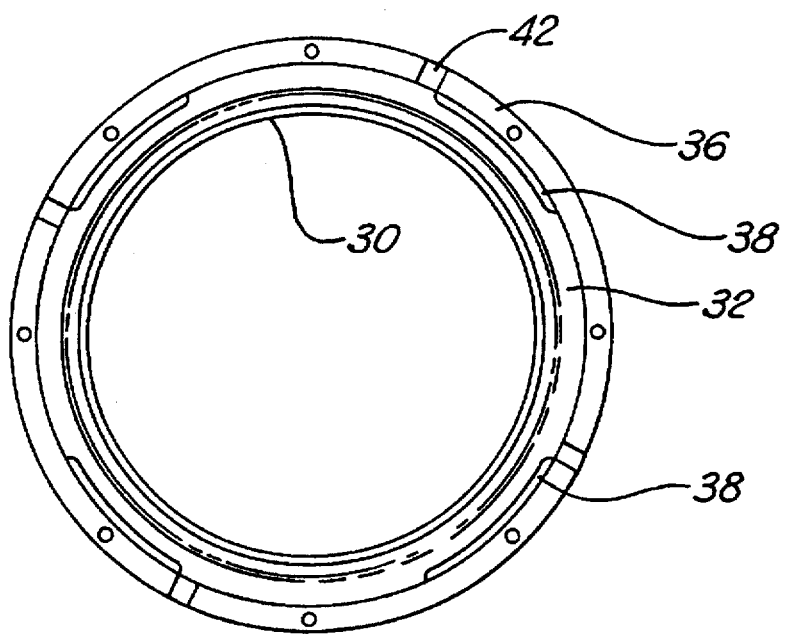
FIG. 9 is an end view of a first embodiment of a clutch cover.

Adjustment mechanism 20 includes a first or left hand cam adjusting ring 46 having circumferentially spaced first cam ramps 48, and a second or right hand cam adjusting ring 50 having circumferentially spaced second ramps 52, as shown in FIG. 8. Cam ramps 48 and 52 engage each other. A peak or apex 54 of second cam adjusting ring 50 engages diaphragm spring 26 opposite arcuate travel stop 40. A cam biasing spring 56 is disposed between pressure plate 24 and second cam adjusting ring 50, rotatively biasing second cam adjusting ring 50 relative to first cam adjusting ring 46 and pressure plate 24. Cam biasing spring 56 could alternatively be disposed between pressure plate 24 and first cam adjusting ring 46. An effective thickness A of pressure plate 24 is established between apex 54 and engaging surface 57.

An inside diameter 62 of diaphragm spring 26 is defined by a plurality of fingers 64 extending radially inwardly. Fingers 64 are engaged by release mechanism 18 at inside diameter 62 for application and release of clutch 10.

Clutch assembly 10, shown in an engaged position in FIG. 1, operates in the following manner. Diaphragm spring 26 engages spring pivot 38 at its outside diameter 39 and reacts against apex 54 of second cam adjusting ring 50 radially inwardly of outside diameter 39, pressing first cam adjusting ring 46 against pressure plate 24 in turn pressing driven disc 16 against flywheel 12. The press fit force between separator pin 44 and pressure plate 24 is sufficiently light to enable pin 44 to slide responsive to the force induced by diaphragm spring 26. As driven disc 16 wears, pin 44 slides an equal amount through pressure plate 24. Pulling release mechanism 18 back toward the transmission and away from flywheel 12 unloads pressure plate 24, enabling it to move away from driven disc 16 as shown in FIG. 2. Typically, pressure plate 24 is biased away from driven disc 16 by a connecting member, such as the strap (not shown) between pressure plate 24 and cover 22. Separator pins 44 engage tabs 42 to limit the travel of pressure plate 24 relative to cover 22, as the bias force produced by the strap or its equivalent is insufficient to overcome the press fit of the pin. Engagement of pins 44 with tabs 42 establishes the width of gap B between pressure plate 24 and flywheel 12 in the released position of FIG. 2. Relative rotation between first and second cam rings 46 and 50 induced by spring 56 eliminates any gap between apex 54 and spring 26 created when pins 44 move within pressure plate 24, and increase the effective thickness of the pressure plate T by an amount equal to the change in gap B.

When the release mechanism 18, as shown in FIG. 3, overtravels the release position of FIG. 2, travel stop 40 prevents any additional adjustment of adjustment mechanism 20 beyond that which occurred as described in FIG. 2. When release mechanism 18 overtravels, diaphragm spring 26 pivots about travel stop 40, and its outside diameter unseats from spring pivot 38. Overadjustment of adjustment mechanism 20 is undesirable because the resultant excessive thickness of T makes it difficult to obtain complete clutch releases in subsequent clutch cycles. Adjustment mechanism 20, in combination with travel stop 40, prevents over adjustment to maintain both a consistent disengaged position for release mechanism 18, and a consistent clutch-apply load.

Figure 4:
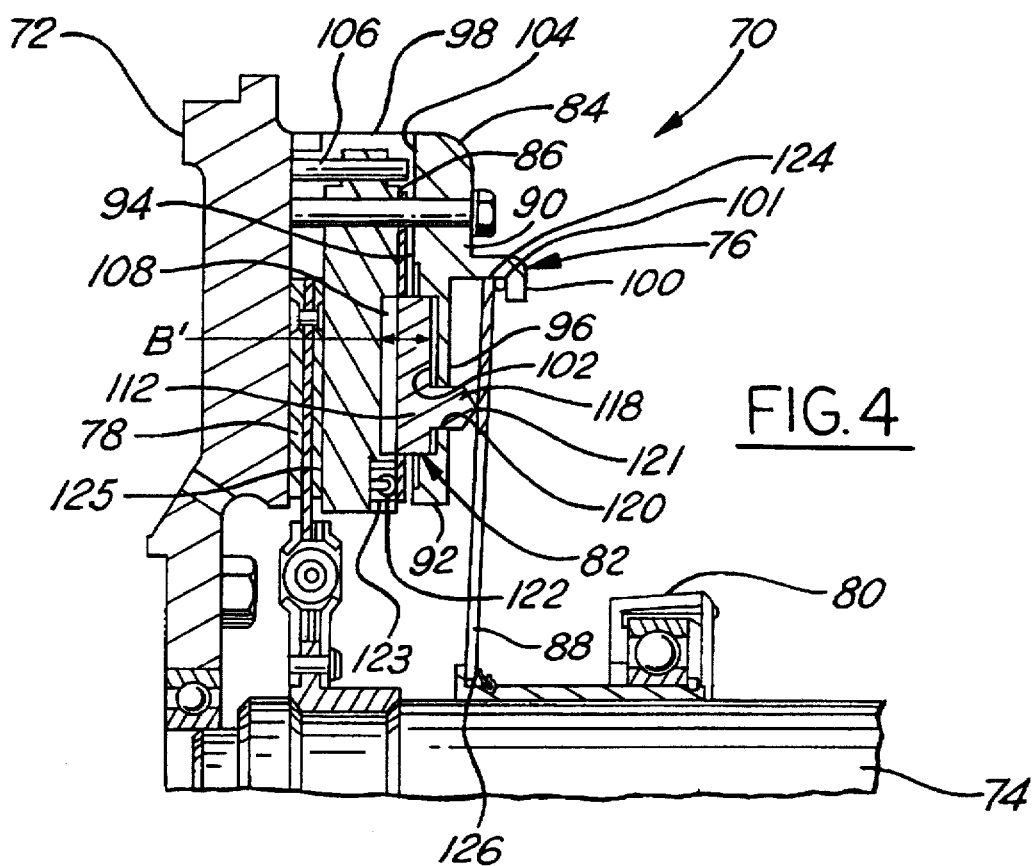
FIG. 4 is a sectional side view of a clutch assembly incorporating a second embodiment of the present invention in the engaged position.
Figure 5:
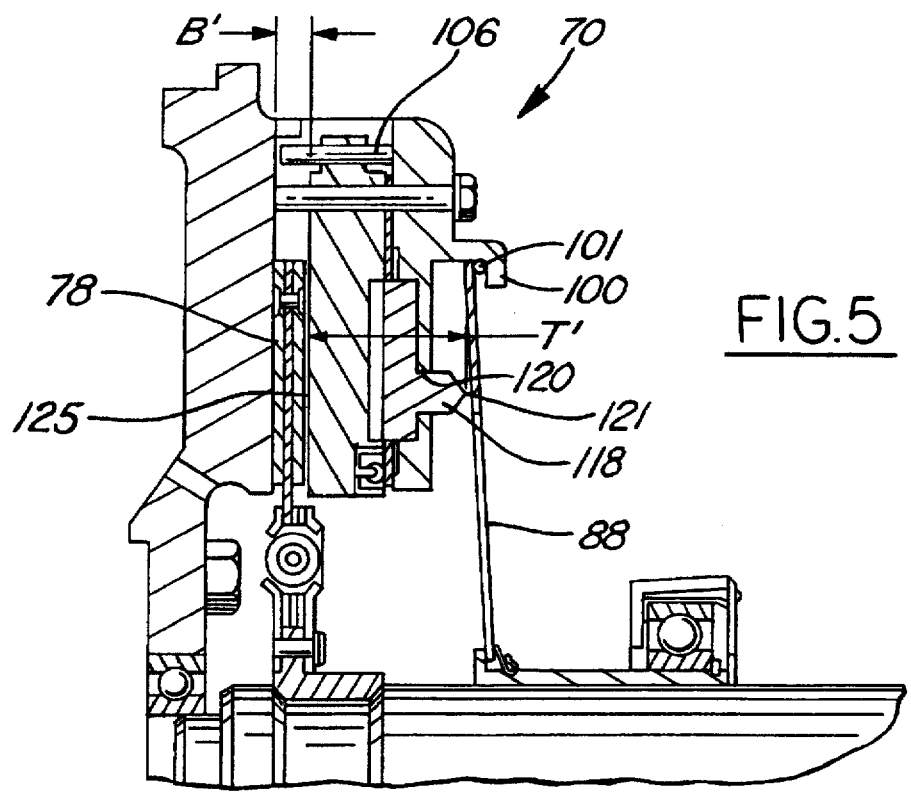
FIG. 5 is a sectional side view of the clutch assembly of FIG. 4 in the released position.

A second embodiment of a pull-type clutch assembly 70 shown in FIGS. 4 and 5 has elements equivalent to those in clutch assembly 10. A flywheel 72 is fixed to an engine crankshaft (not shown) for unitary rotation therewith. A splined transmission input shaft 74 passes through a cover assembly 76 and is engaged by a splined hub of driven disc assembly 78. A release mechanism 80 is disposed over shaft 74. An adjustment mechanism 82 is disposed within cover assembly 76.

Cover assembly 76 includes a cast cover 84. As previously noted, alternative cover embodiments can be formed of steel, or a composite material. A pressure plate 86 is rotatably fixed relative to cover 84, yet is axially moveable relative thereto by a strap (not shown) or other means. A diaphragm spring 88 is disposed between cover 84 and pressure plate 86. A body portion 90 has a central aperture 92 which receives shaft 74. Body portion 90 has a first side 94 disposed toward flywheel 72 and driven disc assembly 78, and also has an oppositely facing second side 96. An engagement portion 98 extends from first side 94 for engagement of cover 84 with flywheel 72, spacing first side 94 from flywheel 72. An arcuate diaphragm spring retention portion 100 extends radially inward, trapping a steel ring 101 which serves as a pivot for diaphragm spring 88. An arcuate travel stop 102 is defined by a channel on first side 94 of pressure plate 86. Cover 84 also has a pin engagement surface 104 engaged by separator pin 106 in the release position shown in FIG. 5 which defines a gap B' between flywheel 72 and pressure plate 86.

Adjustment mechanism 82 includes a first cam adjusting ring 108 having first cam ramps and a second cam adjusting ring 112 having second cam ramps in engagement with the first cam ramps like cam ramps 48 and 52 of rings 46 and 50. Tip segments 118 are arcuately shaped and circumferentially spaced from each other, extending axially from second cam adjusting ring 112, and pass through cover slots 120 to engage diaphragm spring 88 at an apex 121. Tip segments 118 pass between web sections (not shown) defining slots 120 of cover 84. A cam biasing spring 122 engages a driver plate 123 fixed to cam ring 108 to induce a bias force between first and second cam adjusting rings 108, 112. Cam adjusting tings 108, 112 define an effective thick T' of pressure plate 86 between apex 121 and a pressure plate engagement surface 125.

Diaphragm spring 88 engages steel ting 101 at its outside diameter 124. Release mechanism 80 engages diaphragm spring 88 at an inside diameter 126.

Clutch assembly 70 works much like clutch assembly 12, except that adjustment is limited by channel 102. As shown in FIG. 5, when release mechanism 80 overtravels, adjustment of adjustment mechanism 82 is limited by engagement of second cam adjusting ring 112 with travel stop, or channel 102.

Figure 6:
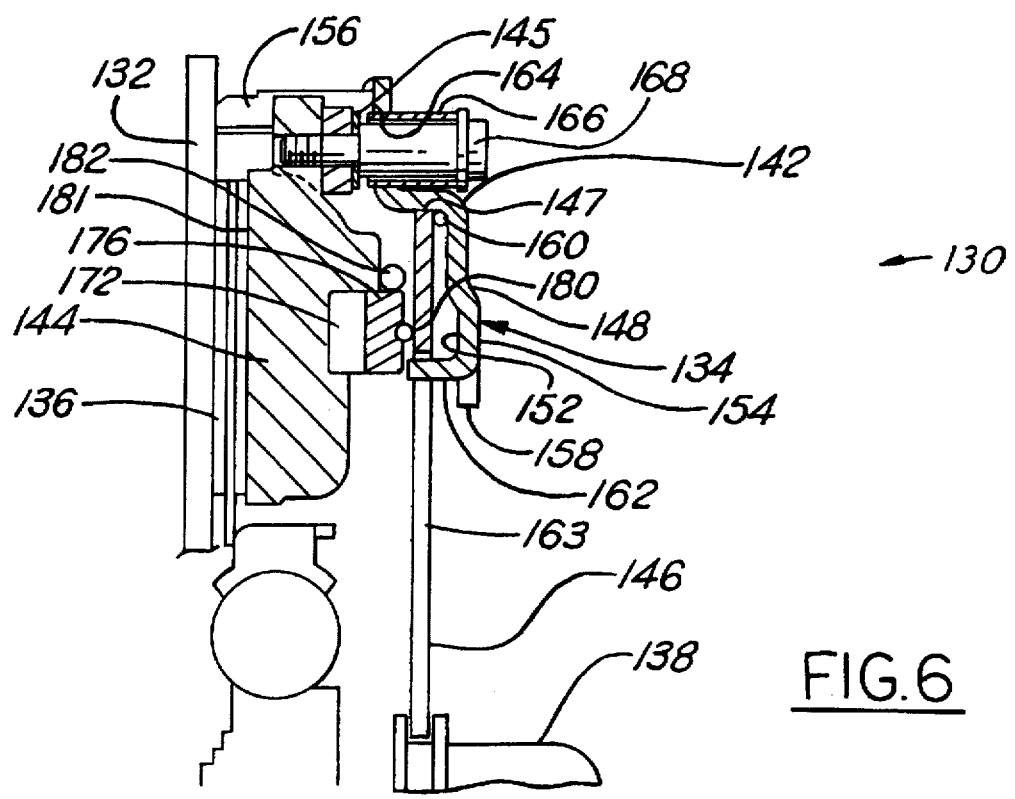
FIG. 6 is a sectional side view of a clutch assembly incorporating a third embodiment of the present invention in the engaged position.
Figure 7:
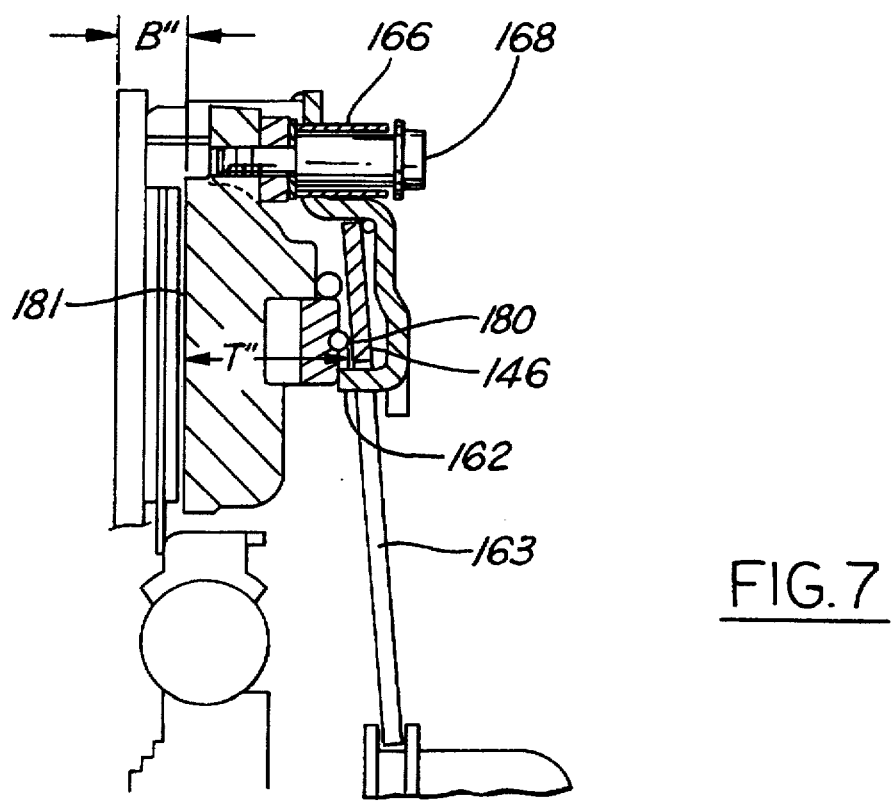
FIG. 7 is a sectional side view of the clutch assembly of FIG. 6 in a released position.

A third embodiment of a pull-type clutch assembly 130 is shown in FIGS. 6 and 7. Flywheel 132 has a cover assembly 134 fixed thereto. A release mechanism 138 engages cover assembly 134.

Cover assembly 134 includes a stamped steel cover 142 and a pressure plate 144 connected thereto by a strap 145 which rotatably links pressure plate 144 with cover 142 while enabling relative axial movement therebetween. As is appreciated, alternative embodiments of the cover could be formed of cast iron or steel. Diaphragm spring 146 is disposed between cover 142 and pressure plate 144 and is engaged by release mechanism 138. Cover 142 has a body portion 148 spaced from flywheel 132 and has a first side 152 facing flywheel 132 and an oppositely facing second side 154. Body portion 148 has a central aperture 158 accommodating entry of release mechanism 138 and transmission input shaft (not shown). An engagement portion 156 extends from body portion 148 to flywheel 132, spacing body portion 148 from flywheel 132.

A steel ring 160 disposed between diaphragm spring 146 at its outside diameter 147 and first side 152 serves as a pivot for spring 146. An arcuate travel limit is defined by a plurality of tines 162 extending from cover 142 toward flywheel 132 between fingers 163 of diaphragm spring 146.

Cover 142 also has a sleeve aperture 164 accommodating a sleeve 166 which is pressed thereinto. Sleeve 166 has a function equivalent to that of pins 44 and 106 in the first and second embodiments respectively. A pin or stud 168 with an oversized head passes through sleeve 166 and engages pressure plate 144, fixing one end of strap 145 to pressure plate 144. The head of stud 168 is larger than the opening in sleeve 166, providing an engagement surface for sleeve 166 which limits the travel of released pressure plate 144, defining a gap B" between pressure plate 144 and flywheel 132.

Adjustment mechanism 140 includes first adjusting cam ring 172 having first cam ramps and second adjusting cam ring 176 having second cam ramps which engage the first cam ramps. Together, first and second adjusting cam rings 172, 176 define an effective thickness T" of pressure plate 144. An apex 180 of second adjusting cam ring 176 is defined by a second wire ring mounted thereon and in engagement with diaphragm spring 146 when the clutch is in the engaged position as shown in FIG. 6. Thickness T" is the distance from apex 180 to a pressure plate engagement surface 181. A cam biasing spring 182 induces relative rotation between first and second adjusting cam rings 172, 176.

Clutch 130 operates in much the same manner as clutch assemblies 10 and 70. In the engaged position, as shown in FIG. 6, wire ring 180 is axially loaded by diaphragm spring 146 against second adjusting cam ring 176, in turn loading first adjusting cam ring 172, in turn loading pressure plate 144 which presses driven disc assembly 136 against flywheel 132. The force of diaphragm spring 146 against pressure plate 144 causes pin 168 to force sleeve 166 further into aperture 164. When clutch 130 is released, as shown in FIG. 7, travel of pressure plate 144 toward cover 142 is limited by sleeve 166. Adjustment of second adjusting cam ring 176 is limited by engagement of its backside with travel limit 162. Even when the release mechanism 138 overtravels, as shown in FIG. 7, adjustment mechanism 140 will not overadjust because of the engagement provided by travel limit 162.

We claim:

1. A clutch cover assembly for disposition between a motor vehicle engine having a driving member with an axis of rotation and a transmission having a splined driven member, the clutch cover assembly comprising:

a cover adapted to be fixed to a driving member;

a pressure plate rotatably fixed to the cover and axially moveable relative to the cover between a released position and an engaged position wherein the pressure plate in the released position is closer to the cover than in the engaged position;

separator means for biasing the pressure plate toward the released position;

a diaphragm spring disposed between the cover and the pressure plate biasing the pressure plate toward the engaged position;

an adjustment mechanism disposed between the pressure plate and the diaphragm, the adjustment mechanism including a first cam adjusting ring engaging a second cam adjusting ring, the second cam adjusting ring having an apex engaging the diaphragm spring wherein relative rotation between the cam rings varies an effective thickness of the pressure plate; and a travel stop formed integral with the cover and axially extending toward the apex, the travel stop being aligned with the apex on a side of the diaphragm spring opposite the apex wherein the stop limits axial travel of the diaphragm spring toward the cover, thereby preventing overadjustment of the adjustment mechanism.

2. A clutch cover assembly for disposition between a motor vehicle engine having a driving member with an axis of rotation and a transmission having a splined driven member, the clutch cover assembly comprising:

a pressure plate axially moveable between a released position and an engaged position;

a cover adapted to be fixed to a driving member and the cover rotatably being fixed to the pressure plate and having a first side disposed toward the pressure plate and having an opposite second side and having a spring retention portion projecting from the second side, wherein the pressure plate is closer to the first side in the released position than in the engaged position;

separator means for biasing the pressure plate toward the released position;

a diaphragm spring disposed on the second side of the cover and functionally interposed between the spring retention portion of the cover and the pressure plate, the diaphragm spring biasing the pressure plate toward the engaged position;

an adjustment mechanism disposed between the pressure plate and the diaphragm spring, the adjustment mechanism including a first cam adjusting ring engaging a second cam adjusting ring wherein relative rotation between the cam rings varies an effective thickness of the pressure plate, the cam adjusting rings being substantially disposed on the first side of the cover and the second cam adjusting ring having an apex disposed radially inwardly of the spring retention portion and the apex axially extending from the second cam ring beyond the second side and engaging the diaphragm; and a travel stop in the form of a groove in the first side of the cover wherein the travel stop limits axial travel toward the cover by engaging the second cam adjusting ring thereby preventing overadjustment of the adjustment mechanism.

3. A clutch cover assembly as claimed in claim 2, wherein the groove in the cover is in the form of a channel, and the apex is in the form of segments which are slidably disposed in slots aligned with the channel and passing through the cover.

4. A clutch cover assembly for disposition between a motor vehicle engine having a driving member with an axis of rotation and a transmission having a splined driven member, the clutch cover assembly comprising:

a cover adapted to be fixed to a driving member;

a pressure plate rotatably fixed to the cover and axially moveably relative to the cover between a released position and an engaged position wherein the pressure plate in the released position is closer to the cover than in the released position;

separator means for biasing the pressure plate toward the released position;

a diaphragm spring disposed between the cover and the pressure plate biasing the pressure plate toward the engaged position, the diaphragm spring having a plurality of radially inwardly extending fingers;

an adjustment mechanism including a first cam adjusting ring engaging a second cam adjusting ring, the second cam adjusting ring having an apex engaging the diaphragm spring wherein relative rotation between the cam rings varies in effective thickness of the pressure plate; and a travel stop defined by a plurality of tines formed integral with the cover and axially extending toward and in alignment with the second cam adjusting ring, the tines disposed radially inwardly of the apex and passing between the fingers of the diaphragm spring wherein the tines limit axial travel of the second cam adjusting ring toward the cover, thereby preventing overadjustment of the adjustment mechanism.

* * * * *